United States Patent [19]

Goldstein

[11] Patent Number: 5,003,779
[45] Date of Patent: * Apr. 2, 1991

[54] GEOTHERMAL ENERGY CONVERSION SYSTEM

[75] Inventor: David Goldstein, Adelphi, Md.

[73] Assignee: The United States of America as represented by the Secretary of the Navy, Washington, D.C.

[*] Notice: The portion of the term of this patent subsequent to Feb. 3, 2007 has been disclaimed.

[21] Appl. No.: 539,942

[22] Filed: Jun. 18, 1990

Related U.S. Application Data

[63] Continuation-in-part of Ser. No. 444,350, Dec. 1, 1989, Pat. No. 4,938,026.

[51] Int. Cl.$^5$ .............................................. F03G 7/06
[52] U.S. Cl. ...................................................... 60/527
[58] Field of Search .......................... 60/527, 528, 529

[56] References Cited

U.S. PATENT DOCUMENTS 4,938,026  7/1990  Goldstein .............................. 60/527

Primary Examiner—Allen M. Ostrager
Attorney, Agent, or Firm—Kenneth E. Walden; Jacob Shuster

[57] ABSTRACT

A generator having a tubular gear made of shape memory alloy in sheet form floatingly supported for rotation about an axis fixedly spaced from the rotational axis of a roller gear. The tubular gear is sequentially deformed by exposure to a geothermal heat source and meshing engagement with the roller gear. Such sequential deformation of the tubular gear is controlled by temperature differential to induce and sustain rotation of the gears in response to which the heat energy is converted into electrical energy.

16 Claims, 3 Drawing Sheets

GEOTHERMAL ENERGY CONVERSION SYSTEM

BACKGROUND OF THE INVENTION

This invention relates to the conversion of energy from an enclosed geothermal source into electrical energy using shape memory alloys, and is related to the heat engine disclosed in my prior copending application, Ser. No. 07/444,350 filed Dec. 1, 1989, now U.S. Pat. No. 4,938,026 issued July 3, 1990, with respect to which the present application is a continuation-in-part.

The use of shape memory alloys, especially Nitinol, in a heat engine has been proposed for conversion of solar radiation energy into a more usable form, according to my aforesaid prior copending application, the disclosure of which is incorporated herein by reference. Such heat engine included a thin sheet of Nitinol material formed into a tube having corrugations acting as gear teeth in mesh with teeth of similar profile on a gear roller. One region of the tubular Nitinol sheet is adapted to receive radiation from the sun, whereby the portion of the Nitinol sheet so exposed to the sun expands circumferentially to induce rotation because of unbalanced forces transmitted to the gear roller in mesh with the tubular Nitinol sheet at a non-equilibrium force location spaced away from the heat receiving region. Such gear meshing location is substantially cooler than the radiation heated region by virtue of a space vehicle installation according to my prior copending application aforementioned.

SUMMARY OF THE INVENTION

In accordance with the present invention, geothermally heated fluent material is circulated through a closed chamber in heat conductive relation to a bath of non-corrosive heat conducting liquid within which a tubular gear made of shape memory alloy sheet material is immersed for partial exposure to geothermal heat within a heating region through which deformable corrugations are displaced into a cooler region. The corrugations of the tubular gear meshes with a gear roller having fixed profile teeth at a force transmitting location within the cooler region in nonsymmetrical operational relationship to the heating region to induce rotation of the tubular gear in response to and as a function of a predetermined temperature differential between the liquid bath and the gear meshing location. The temperature differential may be controlled by flow of coolant through the gear roller which effects deformation of the corrugations on the tubular gear as a result of meshing engagement.

BRIEF DESCRIPTION OF THE DRAWING FIGURES

DETAILED DESCRIPTION OF PREFERRED EMBODIMENT

Figure 1:
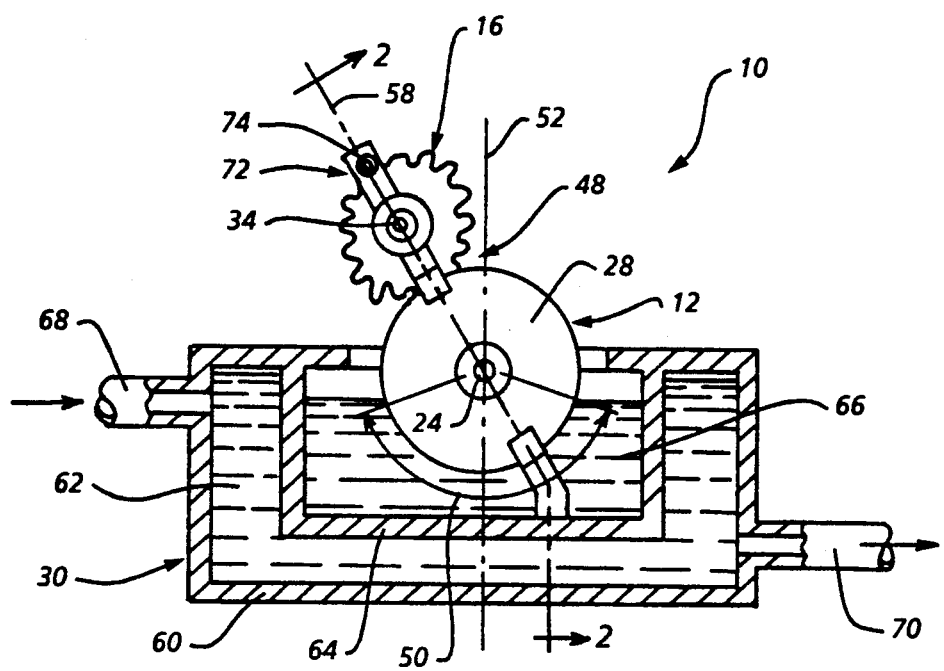
FIG. 1 is a side section view of the generator in accordance with one embodiment of the invention.
Figure 2:
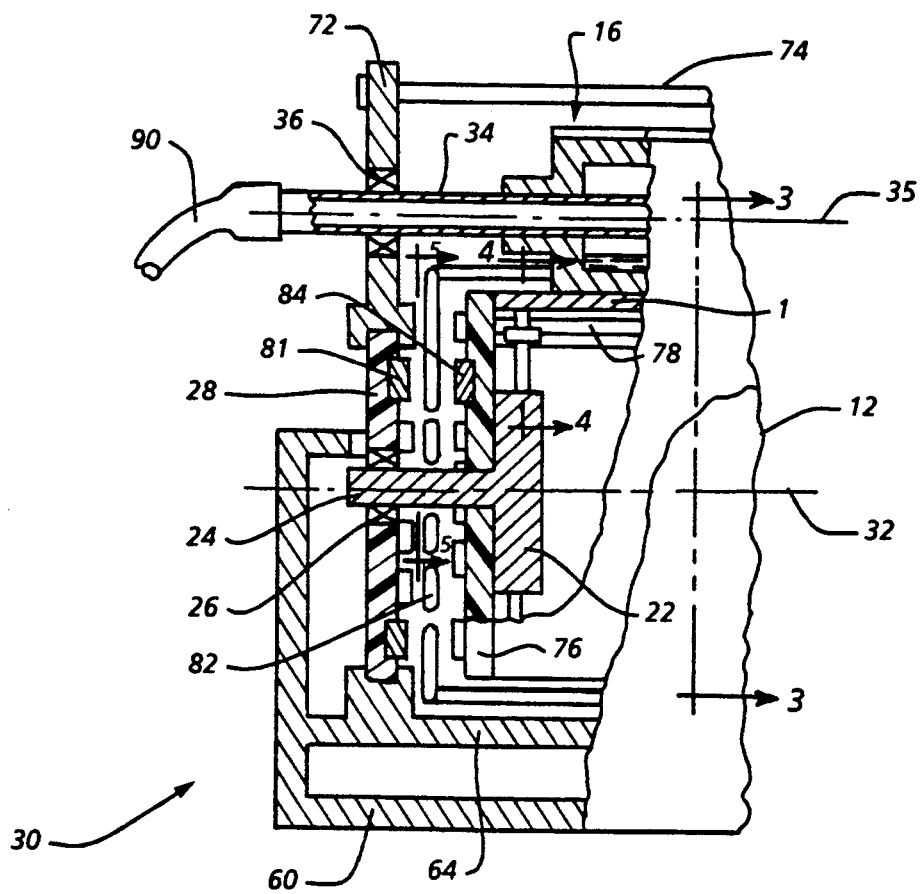
FIG. 2 is an enlarged partial section view taken substantially along section line 2—2 in FIG. 1.
Figure 3:
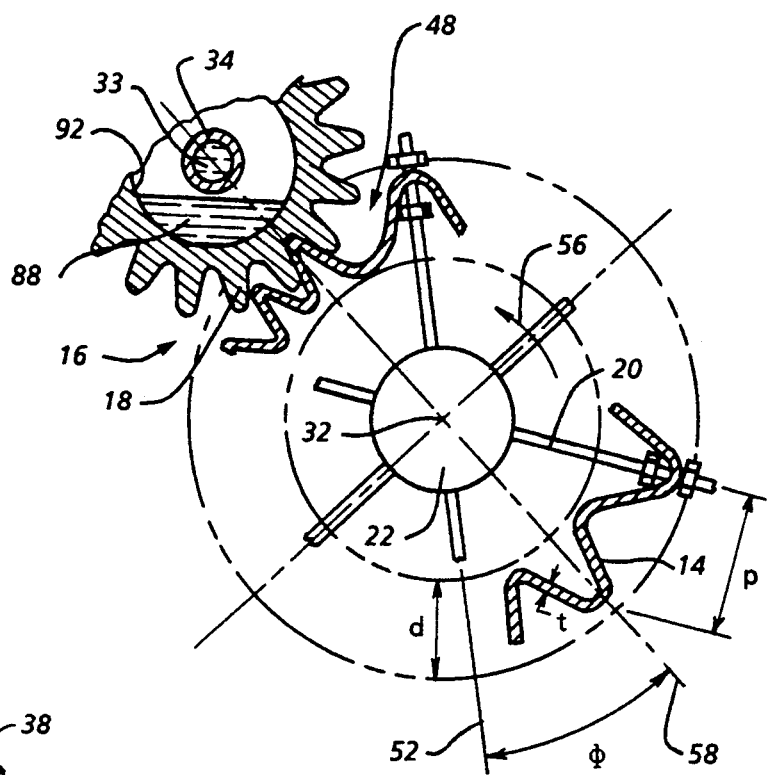
FIG. 3 is an enlarged partial section view taken substantially along section line 3—3 in FIG. 2.
Figure 4:
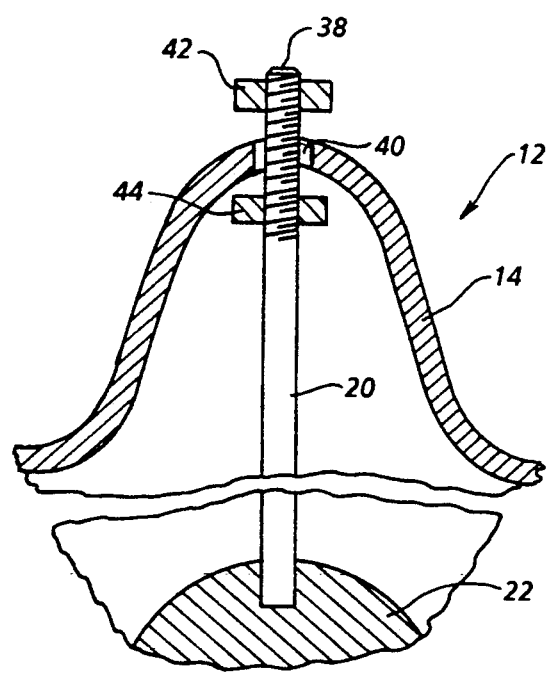
FIG. 4 is an enlarged section view taken substantially along section line 4—4 in FIG. 2.

A generator constructed in accordance with one embodiment of the invention generally referred to by reference numeral 10, comprises a tubular energy input gear 12 as shown in FIGS. 1 and 2. The tubular gear 12 is made of thin Nitinol sheet material formed with corrugations 14 which extend axially and have in cross-section a substantially sinusoidal profile as seen in FIG. 3 and 4. The dimensions of the corrugations are defined by their circumferential spacing or pitch p (the distance between two adjacent peaks), their depth d, measured from the peak to the deepest point of the valley, and the sheet material thickness t, as labeled in FIG. 3. The generator 10 further comprises a driven tubular roller gear 16 having teeth similar in profile to the longitudinal corrugations 14, in the martensitic state, and in mesh therewith at a predetermined force transmitting location on the tubular gear 12. Roller gear 16 is made of a relatively rigid and lightweight material, such as graphite, aluminum, or plastics.

The corrugations 14 on the tubular Nitinol sheet are in an austenitic state prior to assembly of the generator. The dimensions of the corrugations will be "remembered" by each corrugation 14 as it is transformed from the martensitic to the austenitic state during operation of the generator. Such tubular Nitinol gear 12 is carried at each axial end by floating support means such as flexible metal spokes 20 attached to hubs 22 as seen in FIGS. 2 and 3. According to one embodiment the spokes are attached to the hubs by brazing or threading. The hubs have shaft extensions 24 rotatably supported in bearings 26 affixed to axial end discs 28 of a frame assembly generally referred to by reference numeral 30. The tubular gear 12 is thus able to rotate freely about an axis 32 fixedly established between the stationary axial end discs 28. The roller gear 16 is also rotatably supported by the frame assembly and is provided with a tubular shaft 34 journaled by bearings 36 for rotation about an axis 35 fixedly spaced from axis 32.

Each of the floating support means for the tubular gear 12, including the hub 22 and the plurality of flexible spokes 20, is shown in detail in FIG. 4. Axially spaced threads are formed on an end portion 38 of each spoke 20 which projects with clearance through openings 40 at peak portions of those corrugations 14 aligned with the spokes 20 in close adjacency to an axial end of the tubular gear. Internally threaded nuts 42 and 44 are located in adjustably fixed positions on the threaded portion 38 of each spoke 20 closely spaced on radially outer and inner sides of the corrugation peak to limit any displacement of the tubular gear relative to its rotational axis 32 extending through the shaft 24.

As shown in FIG. 1, the Nitinol tubular gear 12 receives heat from an enclosed geothermal source to which the tubular gear is partially exposed within a thermal heating region 50 spaced from a non-symmetrical, force transmitting location of mesh 48 between gear roller 16 and tubular gear 12. The heat exposed portion of the Nitinol tubular gear 12 assumes its austenitic expanded (AE) state within region 50 spaced from a cooler region within which it loses heat before meshing with the teeth 18 of the gear roller 16. Such meshing engagement within the colder region then compresses the corrugations 14 into a martensitic compressed (MC) state.

The circumferential pitch spacing of the teeth 18 on the gear roller is smaller than the spacing p between the corrugations 14 of the Nitinol tube 12 in its expanded austenitic (AE). When the dimensionally expanded corrugations 14 approach meshing engagement at location 48 within the cooler region, as more clearly seen in FIG. 3, the corrugations 14 are compressed into the closer spacing dictated by the teeth 18 of the gear roller 16. The sequential expansion and compression of the corrugations 14 sustains rotation of tubular gear 12 and gear roller 16 in one direction 56 as shown in FIG. 3 under unbalanced forces at the meshing location 48 as further explained hereinafter.

As Nitinol tube 12 rotates, the corrugations 14 in the MC state enter the thermal heating region 50 as shown in FIG. 1 and heat up through absorption of heat while undergoing transition to the austenitic state, "remembering" the more expanded spacing in the previous austenitic state. In so doing, the corrugations 14 exiting the region 50 enter the colder region. Corrugations 14 in the AE state upon entering the colder region cool down and enter the martensitic expanded (ME) state in which the Nitinol material is soft and pliable. In this state, the corrugations 14 mesh with the teeth 18 of the roller 16 at the meshing location 48 to compress the corrugations 14 as more clearly seen in FIG. 3.

Initial heating of the corrugations 14 of the tubular gear 12 within the heating region 50, while stationary relative to its frame assembly 30, produces a net force at the meshing location 48 because of various unbalanced conditions so as to initiate rotation in one direction as indicated by arrow 56 in FIG. 3. Such unbalanced conditions, include for example, an angular deviation $\phi$ between the center line 52 of the geothermal source and a line of symmetry 58 intersecting the rotational axes 32 and 35 as denoted in FIG. 3. The line of symmetry 58 also intersects the force transmitting or meshing location 48 and extends through the heating region 50 in angularly spaced relation to center line 52 as depicted in FIG. 1. Other unbalanced conditions result from non-uniform distribution of internal strain within the Nitinol sheet material caused by its heating within region 50 and unequal transmission of forces in opposite directions therefrom toward location 48. Once such unidirectional rotation is initiated, sequential deformation of the corrugations 14 by heating and by meshing engagement with the teeth 18 of roller 16 augments the unbalanced force condition to sustain rotation. The temperature differential between the heating region 50 and the cooling region, and the rate at which the corrugations are deformed by the teeth of gear roller 16, will establish an angular speed at which rotation of the generator 10 is sustained.

As shown in FIG. 1, the frame assembly 30 includes an outer housing 60 enclosing a chamber substantially filled with a body of geothermally heated fluent material 62. A container 64 is fixed to the frame assembly internally of housing 60 to enclose therein a body of heat conductive liquid 66 that is non-corrosive with respect to the tubular gear 12 immersed therein. The body of liquid 66, such as water, forms a liquid bath occupying the heating region 50. By virtue of heat conduction through container 64, the geothermally heated fluent material 62 and the liquid bath 66 within container 64 constitute the geothermal heat source aforementioned. The fluent material 62 enters and exits the housing 60 through inflow conduit 68 and outflow conduit 70 as depicted in FIG. 1.

The frame assembly 30 also mounts the gear roller 16 in its angular relationship to the tubular gear 12, as hereinbefore described, through axial end supports 72, as shown in FIGS. 1 and 2. The end supports 72 are fixed to the axial end discs 28 and carry the bearings 36 through which the tubular shaft 34 extends from the axial ends of the gear roller 16. The end supports 72 are maintained in fixed axially spaced relation to each other by a tie rod 74.

Figure 5:
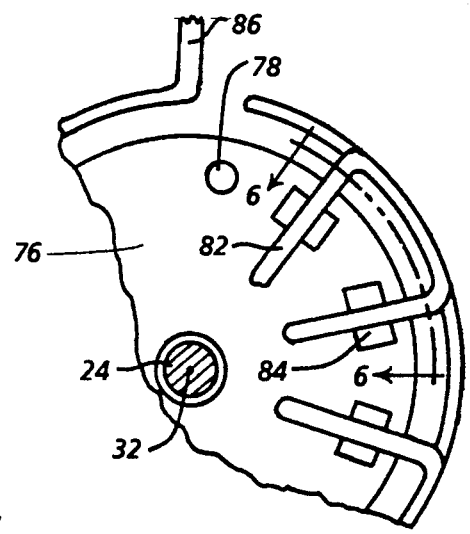
FIG. 5 is a partial section view taken substantially along section line 5—5 in FIG. 2.
Figure 6:
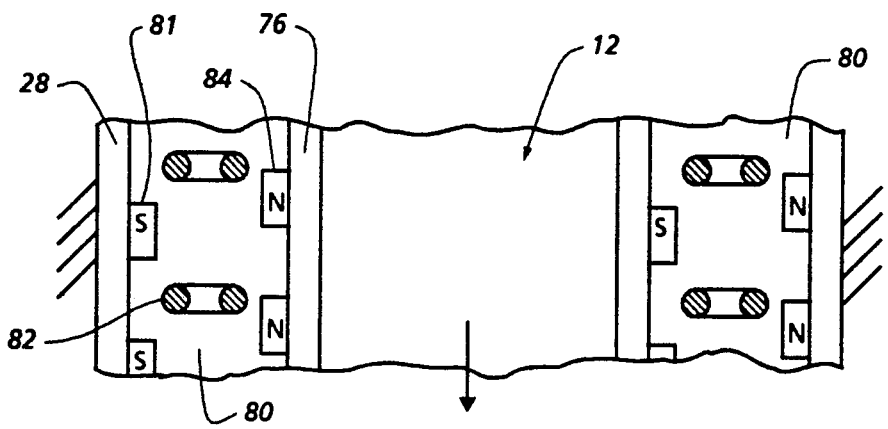
FIG. 6 is a simplified partial top section view taken substantially along section line 6—6 in FIG. 5.
Figure 7:
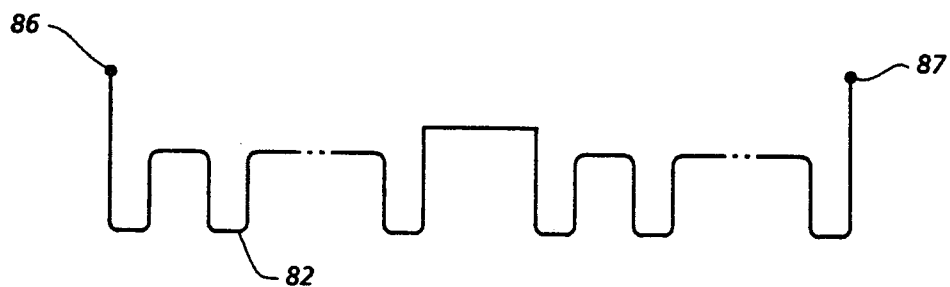
FIG. 7 is a simplified electrical wiring diagram of the interconnection of the coil loops shown in FIGS. 5 and 6.
Figure 8:
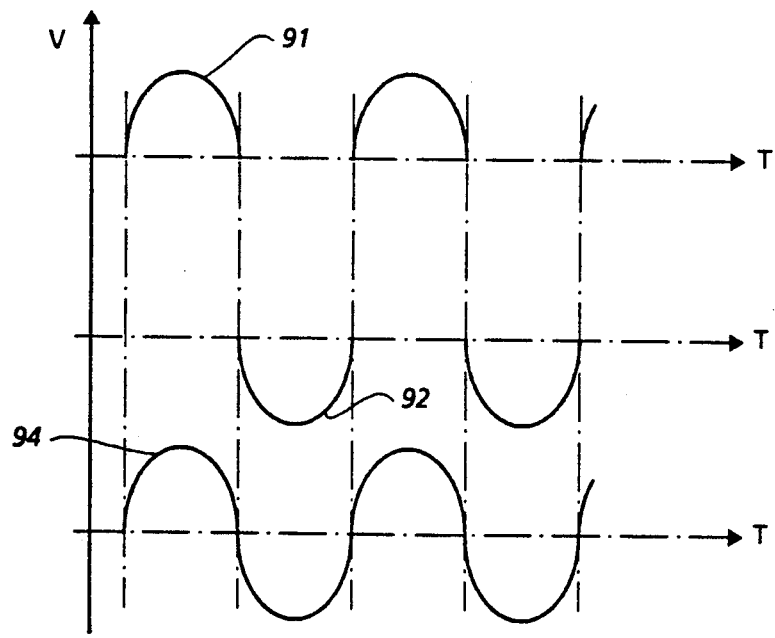
FIG. 8 is a graph showing the voltage induced in the coil loop assembly depicted in FIG. 7.

The opposite axial ends of the tubular gear 12 are closed by discs 76 rotatable therewith as shown in FIGS. 2 and 5. The hubs 22 aforementioned are fixed to the discs 76. Tie rods 78 interconnect the discs 76 to maintain them in fixed axially spaced relation to each other clamped to the tubular gear 12 at its opposite axial ends. Each rotatable disc 76 is furthermore axially spaced from one of the stationary end discs 28, as more clearly seen in FIG. 6, to form a magnetic field zone 80 through which stationary electrical wire loops 82 extend. Magnetic fields are established within zone 80 between the discs 28 and 76 by permanent magnet elements 81 and 84 respectively carried by the discs with confronting pole faces circumferentially spaced by equal amounts on the respective discs. The confronting pole faces on the magnetic elements in each zone 80 are of opposite polarity so as to establish the magnetic fields by virtue of magnetic flux extending axially between the pole faces. As each disc 76 rotates relative to a stationary disc 28, circumferentially spaced pairs of the magnetic elements 84 and 81 move between relative positions of alignment and maximum non-alignment to cyclically change the magnetic field strengths between maximum and minimum levels at a frequency dependent on rotation of the tubular gear 12. Accordingly, the cutting of the flux of such magnetic fields by the electrical wire of each loop 82 induces therein fluctuating dc voltage 91 and 92 of opposite sign as depicted in FIG. 8. The coil loops 82 within the zones 80 are interconnected in series as shown in FIG. 7 for conducting alternating current corresponding to the combined voltage 94 as depicted in FIG. 8, because of reversal of polarity of the pole faces at opposite axial ends of tubular gear 12 as shown in FIG. 6. Electrical energy is withdrawn from the generator 10 through terminals 86 and 87 between which the interconnected coil loops 82 extend as shown in FIG. 7.

The generation of electrical energy in response to rotation of the tubular gear 12 as hereinbefore described requires a predetermined temperature differential between the thermal heating region 50 and the gear meshing location 48 within the cooler region exposed to air above the liquid bath 66. In accordance with one embodiment of the invention, the meshing location 48 is additionally cooled by a body of coolant liquid 88, such as water, collected within a cylindrical cavity of the gear roller 16 as shown in FIG. 3 to assist natural air cooling and control the temperature differential. The coolant is circulated through the tubular shaft 34, to and from some suitable supply through tubing 90 as shown in FIG. 2. The tubular shaft 34 is provided with perforations 92 internally of the gear roller 16 as shown in FIG. 3 to allow small quantities of the coolant to drip into the collected body of coolant 88.

The fluent material 62 circulated through the housing 60 may be in the form of geothermal brine at temperatures of 100° C. to 125° C., available in extensive quantities in the Gulf coast of the United States under well head pressures of 1000 psi to 2000 psi, for example. Other fluent materials may of course be utilized in order to accommodate other installational locations for the generator. Also the magnetic discs 28 and 76 associated with the tubular Nitinol gear 12, as hereinbefore described, may alternatively be associated with the gear 10 roller 16 to generate and extract electrical energy as a result of its rotation.

Other modifications and variations of the present invention are possible in light of the foregoing teachings. It is therefore to be understood that within the scope of the appended claims the invention may be practiced otherwise than as specifically described.

What is claimed is:

1. In combination with a source of heat energy, means for converting the heat energy into electrical energy including: a pair of gears and frame means mounting said gears for rotation in operatively orientated relation to said source, one of said gears comprising a tubular element rotatably mounted by the frame means for exposure to the source of heat energy within a thermal heating region, said tubular element including deformable means in meshing engagement with the other of the gears within a thermally colder region for inducing rotation of the gears.

2. The combination of claim 1 wherein said source of heat energy is of geothermal origin.

3. The combination of claim 1 wherein said source of heat energy includes a body of geothermally heated fluent material.

4. The combination of claim 3 wherein said thermal heating region is established by a container fixed to the frame means in heat conductive relation to said geothermally heated fluent material and a body of heat conducting fluid retained in said container establishing said thermal heating region through which said deformable means is displaced in response to said rotation of the gears.

5. The combination of claim 4 wherein said heat conducting fluid is a corrosion resistant liquid.

6. The combination of claim 5 including coolant conducting means extending through the other of the gears for establishing a predetermined temperature differential between said thermal heating region and a force transmitting location at which said meshing engagement between the gears occurs.

7. The combination of claim 6 including magnetic means responsive to the rotation of said one of the gears for producing cyclically varying magnetic fields and electrical conductor means mounted in operative relation to said fields for withdrawing the electrical energy.

8. The combination of claim 1 including coolant conducting means extending through the other of the gears for establishing a predetermined temperature differential between said thermal heating region and a force transmitting location at which said meshing engagement between the gears occurs.

9. The combination of claim 1 including magnetic means responsive to the rotation of said one of the gears for producing cyclically varying magnetic fields and electrical conductor means mounted in operative relation to said fields for withdrawing the electrical energy.

10. The combination of claim 1 including magnetic means responsive to the rotation of the other of the gears for producing cyclically varying magnetic fields and electrical conductor means mounted in operative relation to said fields for withdrawing the electrical energy.

11. In combination with a geothermal source of heat, energy converting means including: a pair of gears and frame means rotatably mounting said gears in operatively orientated relation to said source for exposure thereto within a thermal heating region, one of said gears including deformable means in meshing engagement with the other of the gears within a thermally colder region for inducing rotation of the gears.

12. The combination of claim 11 wherein said geothermal source of heat includes a body of geothermally heated fluent material, a container fixed to the frame means in heat conductive relation to said geothermally heated fluent material and a body of heat conducting fluid retained in said container through which the deformable means is displaced in response to said rotation of the gears.

13. The combination of claim 11 including coolant conducting means extending through the other of the gears for establishing a predetermined temperature differential between said thermal heating region and a force transmitting location at which said meshing engagement between the gears occurs.

14. The combination of claim 11 including magnetic means responsive to the rotation of said one of the gears for producing cyclically varying magnetic fields and electrical conductor means mounted in operative relation to said fields for withdrawing electrical energy.

15. In combination with a source of heat, energy converting means including: a pair of meshing gears, frame means mounting said gears in operative relation to said source for establishing a temperature differential therein inducing rotation of the gears and magnetic means mounted in operative relation to one of said gears for extracting electrical energy in response to said rotation of the gears.

16. The combination of claim 15 wherein said one of the gears comprises a tubular member made of a sheet of shape memory material having corrugations acting as gear teeth in meshing engagement with the other of the gears.

* * * * *